(12) United States Patent
Ko

(10) Patent No.: US 8,270,636 B2
(45) Date of Patent: Sep. 18, 2012

(54) PHOTON AUDIO AMPLIFIER AND FIBER LINK FOR AUDIO SYSTEMS

(76) Inventor: Chun Ming (Jimmy) Ko, San Ramon, CA (US)

( * ) Notice: Subject to any disclaimer, the term of this patent is extended or adjusted under 35 U.S.C. 154(b) by 1464 days.

(21) Appl. No.: 11/825,913

(22) Filed: Jul. 10, 2007

(65) Prior Publication Data

US 2009/0016730 A1    Jan. 15, 2009

(51) Int. Cl.
*H03F 99/00* (2009.01)
(52) U.S. Cl. ............ 381/120; 381/104; 381/77; 381/79; 398/115; 398/116; 398/140; 398/141; 398/24; 307/66; 307/46; 320/126; 320/118; 320/128; 320/138
(58) Field of Classification Search .................... 381/74, 381/120, 123, 124, 77, 79, 104; 398/33, 398/115–116, 132–134, 140–142, 23–24; 320/134, 103, 111, 118, 106, 110, 115, 147–148, 320/128, 138, 126; 307/66, 46
See application file for complete search history.

(56) References Cited

U.S. PATENT DOCUMENTS

| | | | |
|---|---|---|---|
| 5,450,624 A * | 9/1995 | Porambo et al. | 455/226.4 |
| 5,923,765 A * | 7/1999 | Elliott | 381/86 |
| 6,037,756 A * | 3/2000 | Pong | 323/222 |
| 7,092,530 B1 | 8/2006 | Beer et al. | |
| 7,493,049 B1 * | 2/2009 | Conemac | 398/141 |
| 2002/0086715 A1 * | 7/2002 | Sahagen | 455/568 |
| 2005/0276544 A1 | 12/2005 | Cheng | |
| 2006/0093374 A1 | 5/2006 | Larson et al. | |
| 2006/0126862 A1 * | 6/2006 | Andrews et al. | 381/77 |
| 2006/0192433 A1 * | 8/2006 | Fuglevand et al. | 307/64 |
| 2007/0293914 A1 * | 12/2007 | Woods et al. | 607/60 |

OTHER PUBLICATIONS

Co-pending U.S. Appl. No. 10/877,594, filed Jun. 25, 2004, "A Fiber Optic Audio Cable", Assigned to the same assignee as the present invention.
Co-pending U.S. Appl. No. 11/132,770, filed May 19, 2005, "A Laser Audio Preamplifier, Volume Control, and Multiplexer", assigned to the same assignee as the present invention.

* cited by examiner

*Primary Examiner* — Disler Paul
(74) *Attorney, Agent, or Firm* — Saile Ackerman LLC; Stephen B. Ackerman

(57) ABSTRACT

Systems and methods to minimize signal loss and distortions with connections of audio sources and speakers are disclosed. Fiber optic cables are used instead of conventional cables. The audio signals are kept always in the analog domain, no matter if they are in optical or electric format. The strength of the audio signals can be controlled by a volume control unit. A small amplifier unit can either directly plugged to speakers are connected to the speakers via a short speaker cable. A preamplifier is no more necessary in the system.

32 Claims, 13 Drawing Sheets

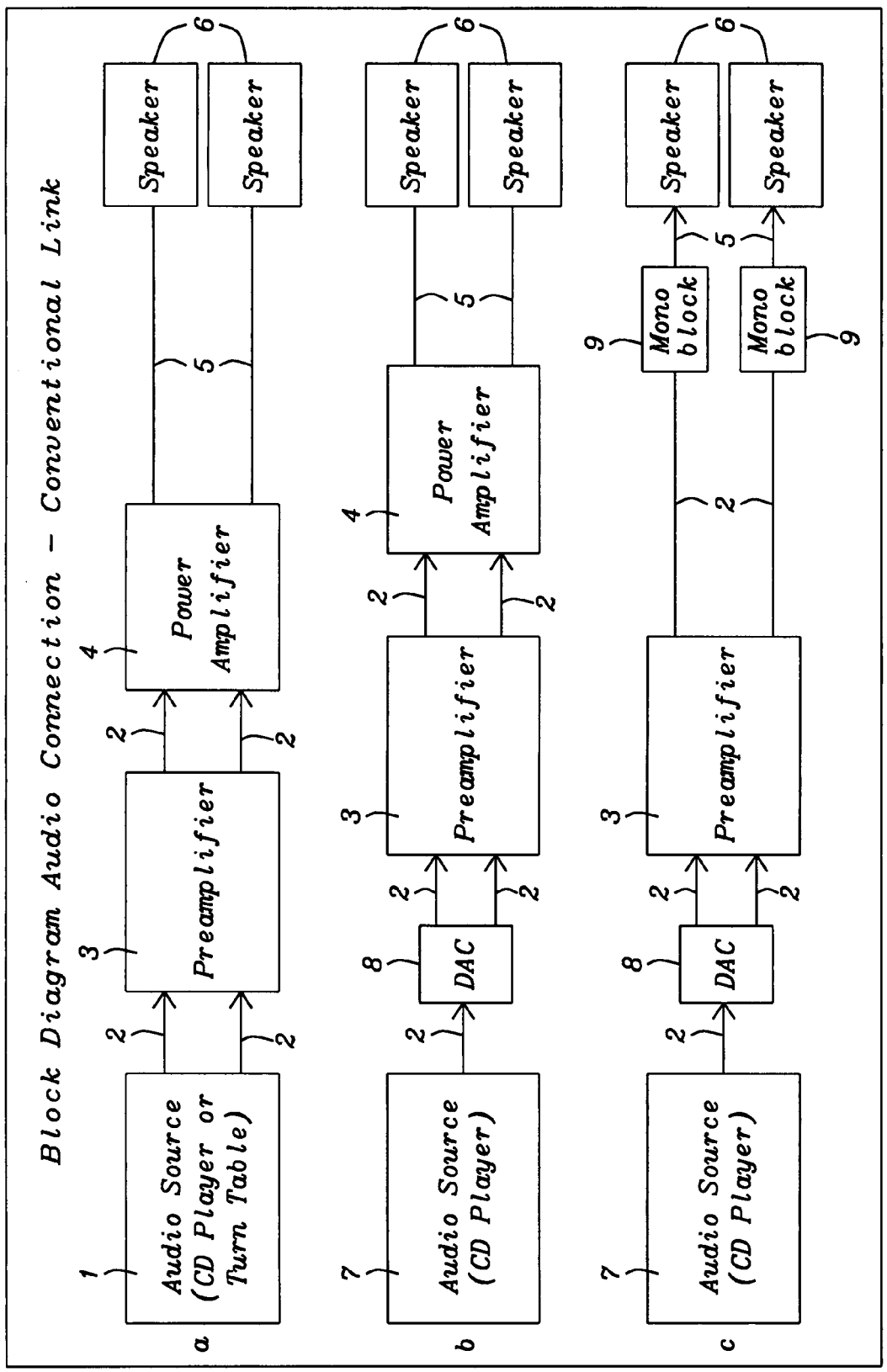
FIG. 1a – Prior Art

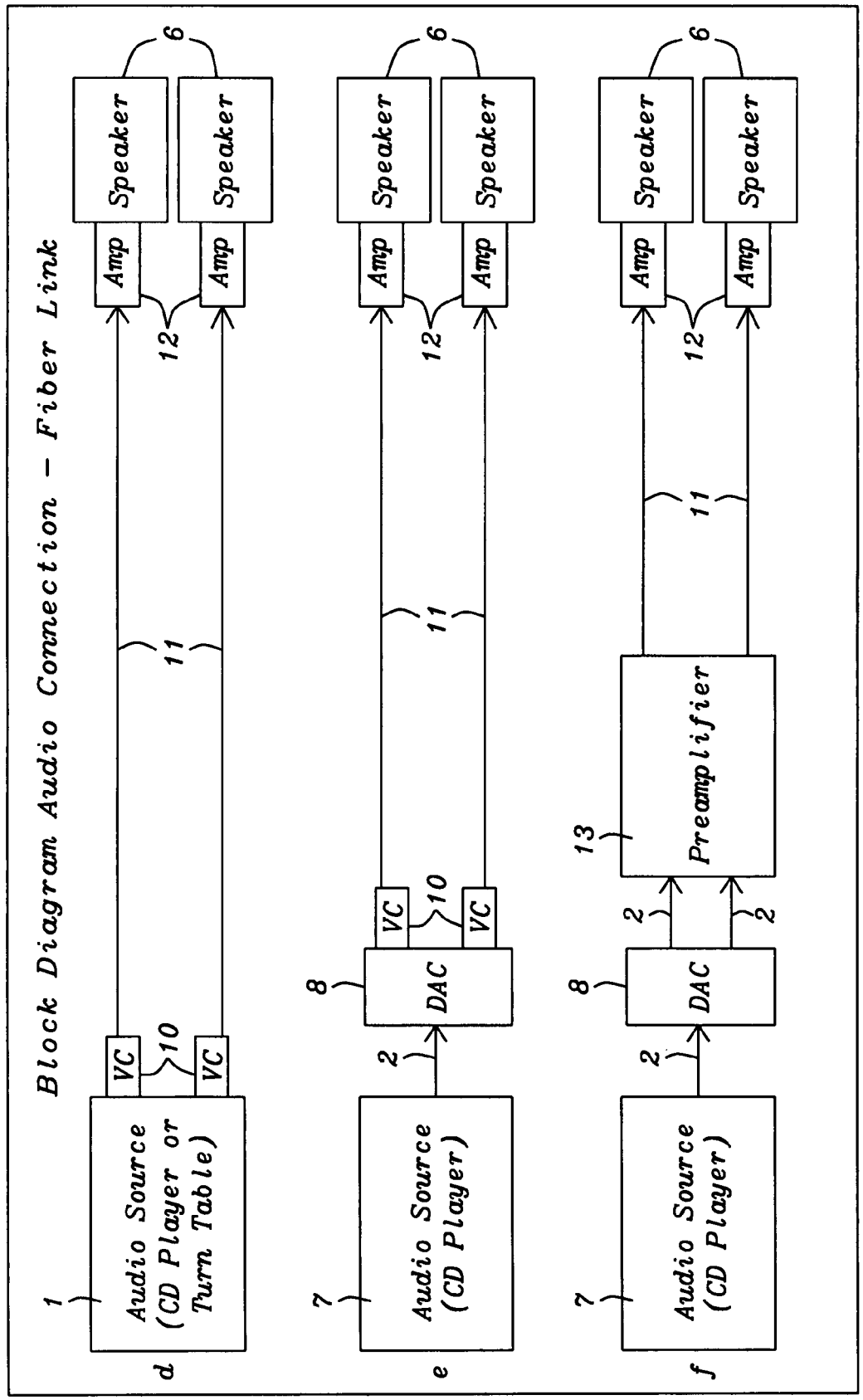
FIG. 1b – Prior Art

PHOTON AUDIO AMPLIFIER AND FIBER LINK FOR AUDIO SYSTEMS

This application is related to application Ser. No. 11/132,770 filed on May 19, 2005 and also to application Ser. No. 10/877,594 filed on Jun. 25, 2004, assigned to the same assignee as the present application, which are incorporated by reference herein.

BACKGROUND OF THE INVENTION

(1) Field of the Invention

This invention relates generally to audio and video components. More particularly, this invention relates to a laser and fiber optic apparatus connection audio source/preamplifier to audio speakers directly using optical fibers for transmission.

(2) Description of the Prior Art

Current conventional audio systems contain four major components: audio source, preamplifier, power amplifier and speakers. These components require different cables to connect each other. The components and connecting cables are listed below:

1. Audio Source:

A traditional audio source (e.g. turn table) has analog output only. A modern audio source (e.g. CD player) contains both analog and digital outputs. If the audio signals from a source are in digital form, an external digital-to-analog converter (DAC) must be added before the audio signals enter a preamplifier. Most audio sources don't have a volume control function. In this case, the volume/signal is controlled by a preamplifier. Some audio sources have volume control function to adjust the amplitude of output signals.

2. Preamplifier

The preamplifier has multiple signal I/Os with various types of connectors (e.g. RCA, XLR, BNC) and volume control function. The preamplifier amplifies the analog audio signals from audio sources or DAC and controls the volume of signals output to a power amplifier. The preamplifier also functions as a multiplexer for multiple input audio sources and multiple output power amplifiers.

3. Power Amplifier

The power amplifier is used to amplify the audio signals and push the signals to speakers. Considering that the amplified signals are easy to decay and the efficiency of speakers, the power amplifier needs to pump up the signals to huge amplitudes. It causes a large electrical current to carry the signals from power amplifier to speakers. In order to keep the signal loss and distortion low, the speaker cables should be as short as possible. Unfortunately, the speakers have to be located (far) away from the power amplifier in most cases. Therefore, the monoblock amplifiers were invented to put the power amplifiers close to speakers. The monoblock amplifiers still need speaker cables to connect speakers. The long signal cables between preamplifier and monoblock power amplifier can still cause significant signal loss and distortion.

4. Speaker

There are a lot of various designs for speakers. However, the speaker design is not in the scope of the invention. There are many types of speaker connectors for speaker cables. The spade and banana connectors are the most popular types.

5. Cables

The interconnect cables between signal source and preamplifier or between preamplifier and power amplifier are so-called signal cables. The cable between source and DAC is also a signal cable even though the signals are digital. The cables between power amplifier and speaker are speaker cables. Comparing with signal cables, the speaker cables need to bear high electrical current. The speaker cables are usually made with pure silver or copper for the high-end audio system.

The existing conventional connections for audio systems are shown in FIG. 1a prior art. First, in alternative (a) an audio source (CD. Player or turn table) 1 is shown having an analog output that is connected via signal cables 2 to a preamplifier 3 that is further connected via signal cables 2 to a power amplifier 4. The power amplifier is connected to speakers 6 via speaker cables 5. Second, in alternative (b) an audio source (e.g. CD Player) 7 is shown having a digital output that is connected via a signal cable 2 to a digital-to analog converter (DAC) 8 that is connected again via signal cables 2 to a preamplifier 3 that is further connected via signal cables 2 to a power amplifier 4. The power amplifier is also connected to speakers 6 via speaker cables 5. Third, alternative (c) illustrates a similar configuration as alternative (b) with the difference that instead of a single power amplifier 4, shown in (b), a monoblock amplifier 9 for each output channel of preamplifier 3 is deployed. The monoblock amplifiers can be deployed close to the speakers and make short speaker cables 5 possible. Similarly monoblock amplifiers could be used in alternative (a) as well instead of a single power amplifier 4.

As shown in FIG. 1a prior art, in a conventional audio system, the audio signals have to go through multiple components and cables from sources to speakers. Each component or cable can cause signal loss and distortion in various levels. It would be desirable to minimize signal loss and distortions between signal sources and speakers.

There are patents and publications known to keep signal loss and distortions low.

U.S. Patent Application Publication (US 2006/0093374 to Larson et al.) proposes a fiber optic communication signal link apparatus for performing fiber optic link communication including a transmitter apparatus and a receiver apparatus coupled by a fiber optic cable. The transmitter is capable of detecting and modulating data that includes at least one of position, light and audio data. An analog voltage signal representing the data is transmitted to the transmitter apparatus wherein the signal is detected, converted to a frequency signal and modulated through the fiber optic cable to the receiver apparatus. Subsequently, the frequency signal is detected, demodulated and converted back to a voltage analog signal in the receiver apparatus.

U.S. Patent Application Publication (US 2005/0276544 to Tsung-Ming Chen) discloses an optical digital audio system having an input receiver module that connects with one or multiple output speaker module(s) via optical fiber cable(s). The input receiver module has an audio signal receiving device, an amplifier and control device, one or multiple digital-to-optical converter(s), and one or multiple optical signal transmitter(s). The output speaker module has an optical signal receiver, an optical-to-digital converter, a digital signal amplifier, a digital-to-analog converter, and a speaker.

(U.S. Pat. No. 7,092,530 to Beer et al.) discloses a motor vehicle audio system having an audio signal receiver, an amplifier connected thereto via a fiber optic cable and a loudspeaker. A separate amplifier is provided for low audio signals. The amplifier is provided with a substantially higher line voltage when compared with the other audio frequency amplifiers.

SUMMARY OF THE INVENTION

A principal object of the present invention is to achieve methods and systems to minimize signal loss and distortion of connections between audio sources and speakers.

A further object of the present invention is to replace high power amplifiers by low power amplifiers without reducing audio quality.

Another object of the present invention is to introduce a small-sized volume control unit.

A further objective of the invention is to use user fiber optic cables instead of conventional cables.

Furthermore another object of the present invention is to keep the audio signals always in an analog domain, no matter if they are in optical or in electric format.

In accordance with the objects of this invention a method to connect all audio and video components of an audio/video system has been achieved. The novel method is comprising, first, providing an audio source, at least one means to control volume of audio signals, a means to convert for each audio channel electrical signals to optical signals, a fiber optic cable for each audio channel, a means to convert for each audio channel, and an amplifier for each audio channel to amplify electrical signals. The following steps describe converting electrical output signals of said audio source from digital to analog if said output signals are digital converting electrical output signals of said audio source from digital to analog if said output signals are digital and controlling the volume of said analog signals. The next steps of the method include converting said volume controlled analog signals from electrical signals to optical signals and transmitting said optical signals via said optical fiber cables to said at least one means to convert optical signals to electrical signals. The last method steps are converting said optical signals to electrical signals, amplifying said transmitted and from optical to electrical converted signals, and providing amplified signals to a speaker.

In accordance with the objects of this invention a system to transmit analog electrical signals from an audio source to speakers via fiber optic cables has been achieved. The system invented comprises, first, a Transmitter Laser Analog Module for each audio channel converting electronic signals into modulated optical signals, a Receiver Laser Analog Module for each audio channel converting optical signals into analog electrical signals, and a fiber optic cable for each audio channel to transmit said optical signals from said Transmitter Laser Analog Module to said Receiver Laser Analog Module. Finally the system comprises an amplifier unit for each audio channel to amplify said electrical signals received by said Receiver Laser Analog Module.

In accordance with the objects of this invention a method to supply DC power to noise-sensitive electronic devices has been achieved. The method comprises, first, providing two battery packs, a battery charger, a battery voltage monitor, a relay driver, and an electronic device to be powered. The next method steps comprise charging a first battery pack having a lower voltage than a second battery pack via said charger and providing power to said electronic device by said second battery pack, wherein the speed of charging is higher than the speed of discharging, and then stopping charging of said first battery pack if a maximum voltage is reached. The last two steps are providing power to said electronic device by said first battery pack when said second battery pack has discharged to a minimum level and start charging said second battery pack and charging and discharging said two battery packs alternatively.

BRIEF DESCRIPTION OF THE DRAWINGS

In the accompanying drawings forming a material part of this description, there is shown:

FIG. 1a prior art shows block diagrams of different alternatives of conventional audio connections FIG. 1b illustrates schematics of the general structure of fiber links connections being the basis of the present invention.

DESCRIPTION OF THE PREFERRED EMBODIMENTS

Figure 2:
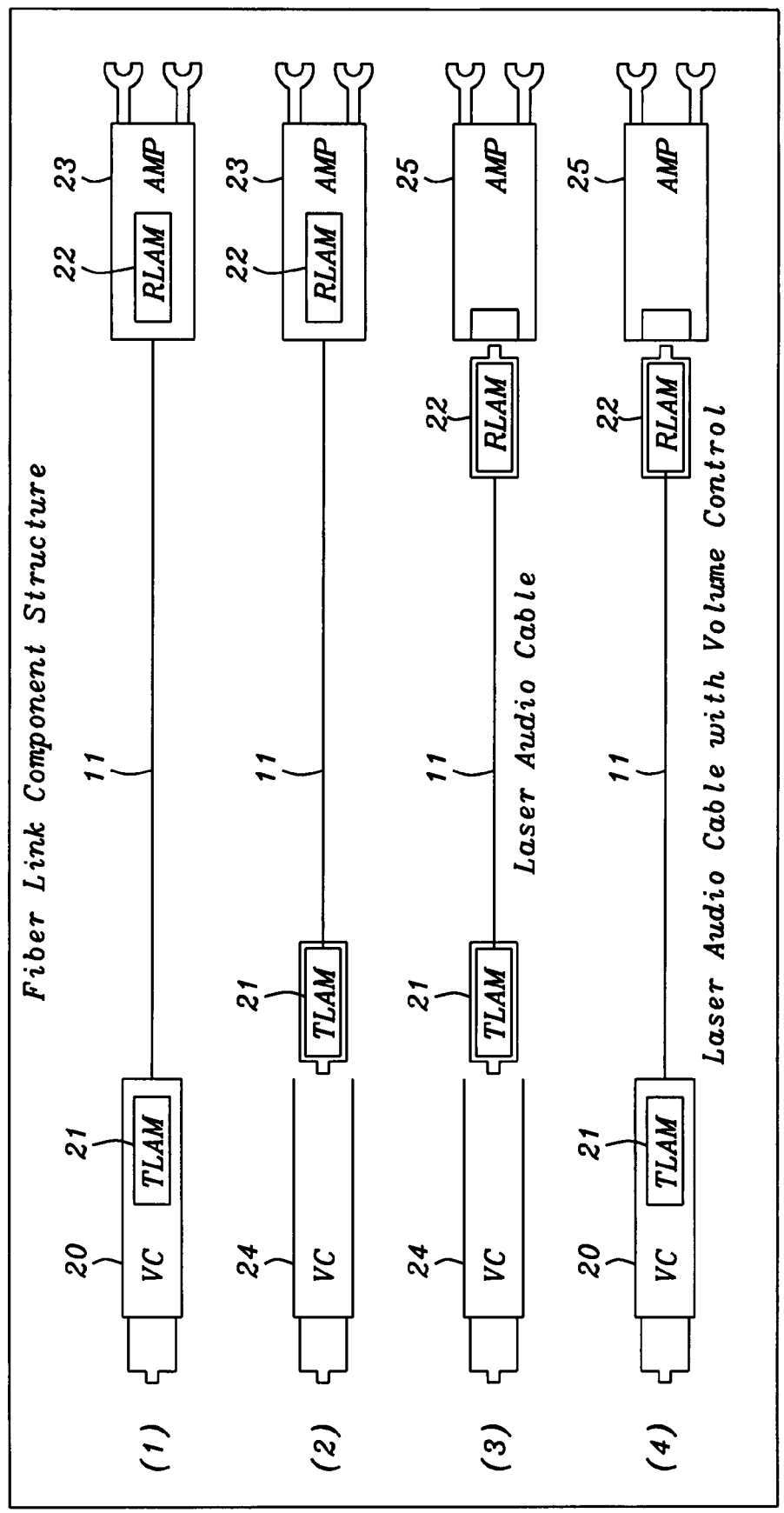
FIG. 2 shows four alternatives of a fiber link component structure and subsequently different types of the present invention.

The preferred embodiments disclose systems and methods to connect audio sources/preamplifiers to audio speakers directly. The transmission media of audio signals is optical fiber. The invention eliminates the need of a conventional preamplifier and power amplifier in conventional audio component links. Using optical fiber as signal transmission media make a very long distance between signal source and speakers without interference and distortions possible.

Referring now to FIG. 1b for schematics of the general structure of fiber links connections being the basis of the present invention. It should be understood that in the present invention for each audio channel a fiber cable and an amplifier is provided. First, in alternative (d) an audio source (CD Player or turn table) 1 is shown having an analog output, wherein volume control modules (VC) 10 are plugged in the analog output. The signals from the output of these volume control modules (VC) 10 are transmitted through optical fibers 11 to amplifiers 12, which are plugged onto speakers 6. These volume control modules 10 and amplifiers 12 will be described in more details later. Second, in alternative (e) an audio source (e.g. CD Player) 7 is shown having a digital output that is connected via a signal cable 2 to a digital-to-analog converter (DAC) 8 wherein volume control modules (VC) 10 are plugged in its analog output. The signals from the output of these volume control modules (VC) 10 are transmitted through optical fibers 11 to amplifiers 12, which are plugged onto speakers 6. Third, alternative (f) illustrates a similar configuration as alternative (e) with the difference that a preamplifier 13 is attached to the digital-to-analog converter 8 and the preamplifier 13 is connected via optical fibers 11 to amplifiers 12. The volume control modules 10 are not required if a preamplifier is used because preamplifiers have already a volume control function. A preamplifier 13 can be connected, instead of the volume control modules 10, directly to the analog output of the source 1 shown in alternative (d) as well. A volume control module 10 provides a single channel input/output. It can be built in audio connectors such as RCA, XLR and BNC.

It should be noted that FIG. 1b illustrates already an important feature of the present invention, i.e. the audio signals are always kept in the analog domain, no matter if they are in optical or electrical format.

FIG. 2 shows four alternatives of a fiber link component structure and subsequently four different embodiments of the present invention.

It should be noted that the operation and design of a Receiver Laser analog module (RLAM), converting optical signals into electrical signals, and of a Transmitter Laser Analog module (TLAM), converting electrical signal into optical signals, are described in co-pending U.S. patent application Ser. No. 11/132,770, filed May 19, 2005, entitled "A Laser Audio Preamplifier, Volume control and Multiplexer" and assigned to the present assignee, and incorporated herein by reference. Both TLAMS and RLAMS are part of the fiber link component structure illustrated in FIG. 2.

Alternative (1) of FIG. 2 illustrates a highly integrated version comprising a volume control module (VC) 20 having integrated a Transmitter Laser Analog module (TLAM) 21, a fiber optic cable 11 and an amplifier 23 having a Receiver Laser Analog module (RLAM) 22 integrated.

Alternative (2) of FIG. 2 illustrates a version comprising a volume control module (VC) 24 and a Transmitter Laser Analog module (TLAM) 21 as separate modules, a fiber optic cable 11 and an amplifier 23 having a Receiver Laser Analog module (RLAM) 22 integrated.

Alternative (3) of FIG. 2 illustrates a version comprising a volume control module (VC) 24 and a Transmitter Laser Analog module (TLAM) 21 as separate modules, a fiber optic cable 11, an amplifier 23 and a Receiver Laser Analog module (RLAM) 22 as separate modules as well. In this alternative the RLAM 22 is connected to the amplifier 23 via a short electrical signal cable.

Alternative (4) of FIG. 2 illustrates a version similar to the version of alternative (1) comprising a volume control module (VC) 20 having integrated a Transmitter Laser Analog module (TLAM) 21, a fiber optic cable 11, an amplifier 23, and having a Receiver Laser Analog module (RLAM) 22 as separate module.

It should be noted that in all four alternatives outlined above metal cables could be used instead of the fiber cables 11, of course without LAMs. In this case the performance would be by far lower than with using fiber cables together with LAMs.

Figure 3:
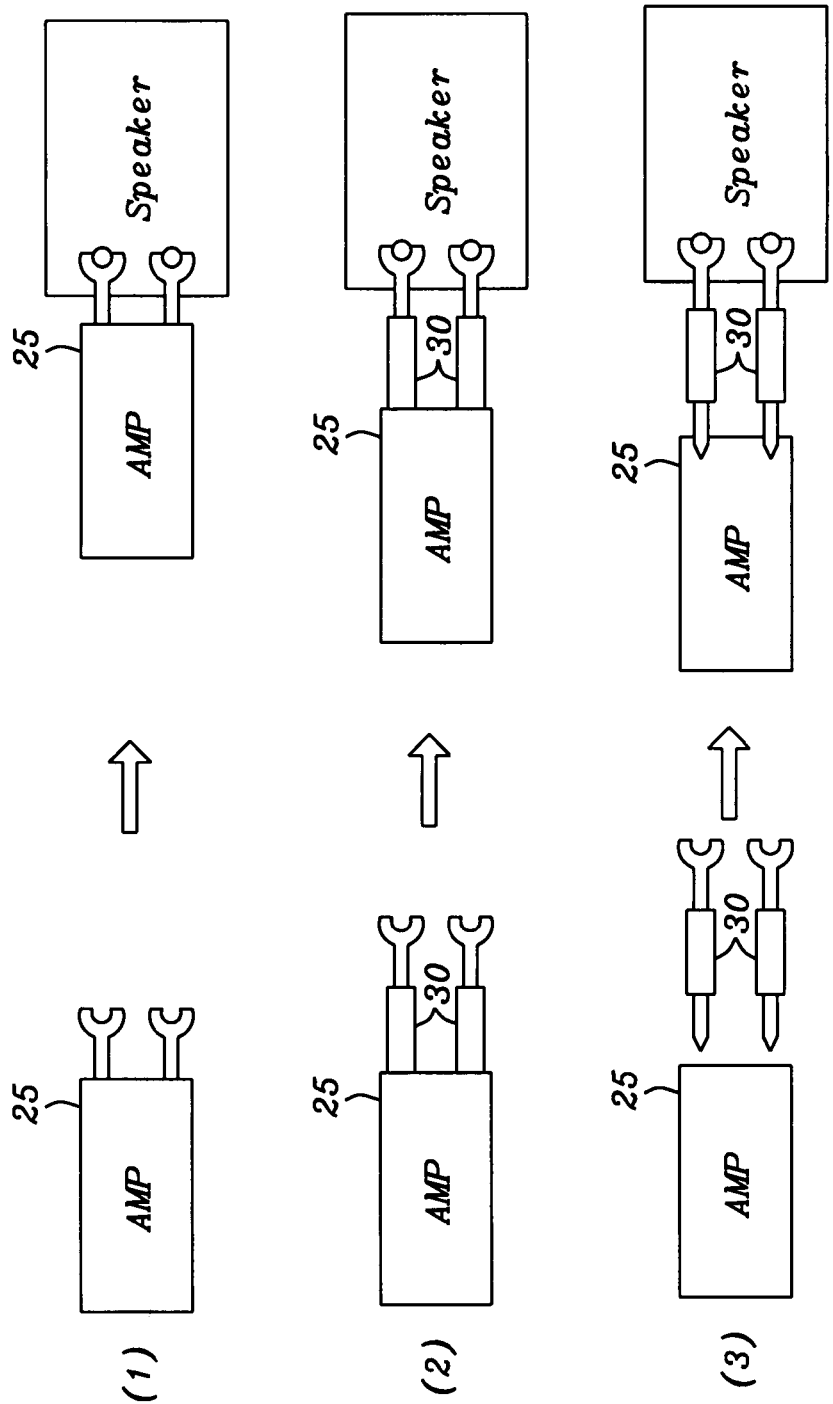
FIG. 3 illustrates possible connections between the amplifier and a speaker

FIG. 3 illustrates possible connections between the amplifier and a speaker. Alternative (1) of FIG. 3 shows a most convenient alternative, i.e. a connection without cables. Amplifier 25 is directly plugged into a speaker in alternative (1). However, the physical design of some speakers does not allow a direct plug-in of the amplifier. In that case, a short electrical pair of speaker cables 30, e.g. less than 6 inches, could be a bridge between amplifier 25 and a speaker as shown in alternative (2) of FIG. 3, wherein this pair of cables is permanently fixed to the amplifier. Furthermore alternative (3) of FIG. 3 shows a pair of speaker cables, which can be separated from the amplifier 25 and the speaker. Therefore an amplifier can be universal for any speaker plug.

Figure 4:
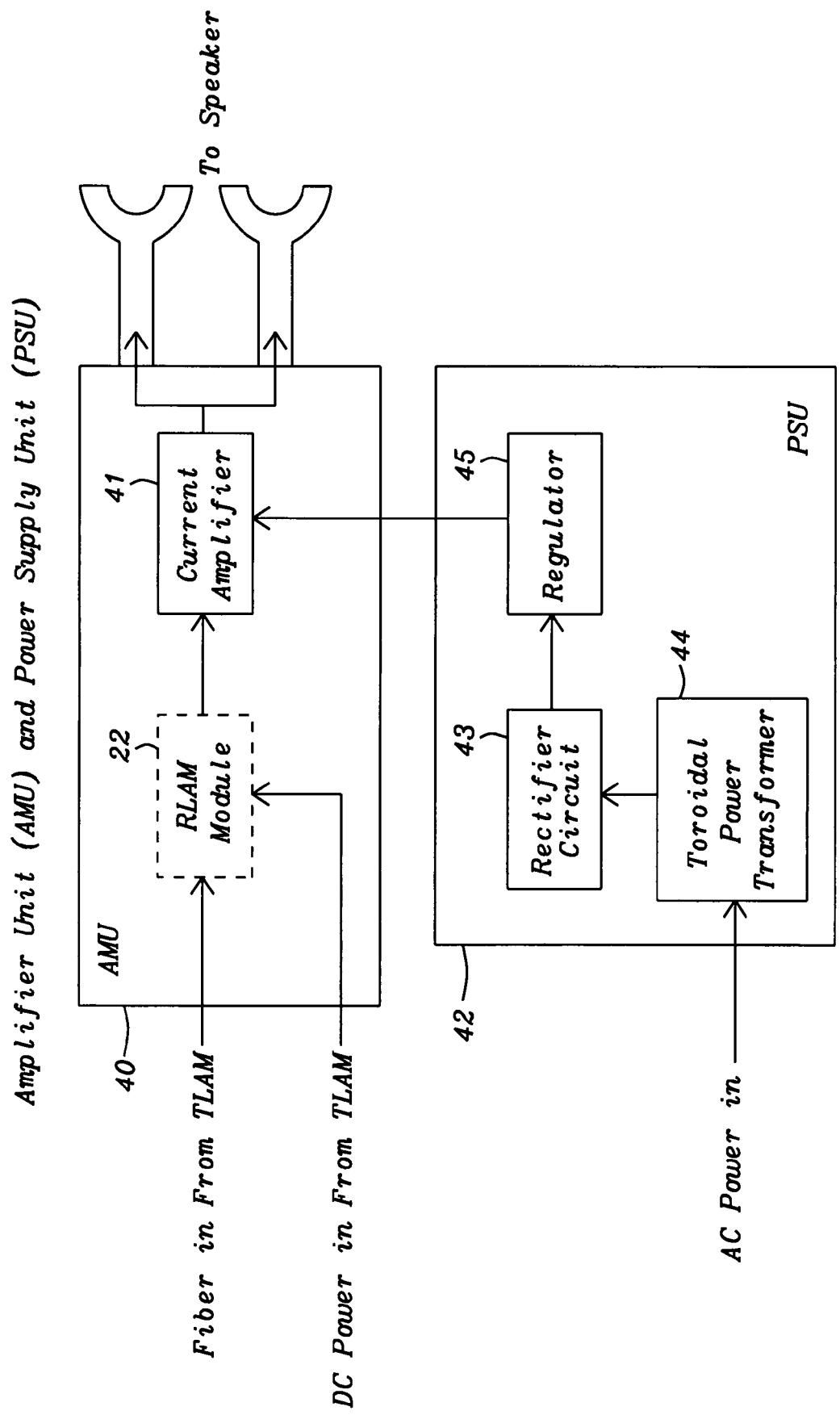
FIG. 4 shows a block diagram of an amplifier unit (AMU) and a corresponding power supply unit (PSU).

FIG. 4 illustrates a block diagram of an amplifier unit (AMU) and a corresponding power supply unit (PSU). In FIG. 4 an amplifier embodiment is shown having a Receiver Laser Analog Module (RLAM) (22) integrated as illustrated in alternatives (1) and (2) of FIG. 2. The RLAM could be separated from the amplifier unit as well as shown in alternatives (3) and (4) of FIG. 2. The RLAM module (22) receives, being integrated into the AMU (40) or separated from the AMU (40), optical signals from a TLAM via a fiber optic cable. Furthermore the RLAM (22) receives DC Power from a TLAM transmitting the optical signals. It is preferred to separate DC power required by the current amplifier 41 from the DC power required by the RLAM module 40 because the DC performance requirements are different The PSU 42 provides the DC power for the current amplifier 41, which is used to amplify the signals and push the signals out of the speakers. Since the signal is very strong, the signal-to-noise (S/N) ratio is not very sensitive for PSU 42. A stable and powerful DC is most important for the design of a PSU 42. Also, since a relative high power is required, an AC-DC transformer is preferred over a DC battery, which is usually not strong enough to provide as much power as required by the current amplifier.

The DC power for LAM modules has different performance requirements. LAM modules require only low power but a high S/N ratio because the signal level is small. In this case, a battery is usually preferred. As described in patent application co-pending U.S. patent application Ser. No. 11/132,770, filed May 19, 2005, entitled "A Laser Audio Preamplifier, Volume control and Multiplexer", depending on the length of fiber cable, only one battery is used for both TLAM and RLAM for a short cable (e.g. <10 meters) or separate batteries for each LAM for a long cable (e.g. >10 meters). In the case of one battery shared by TLAM and RLAM, an electrical wire is needed to be added into the cable tube with fiber. It is the "DC Power To RLAM" in FIG. 5 and "DC Power In From TLAM" in FIG. 4. For long fiber cables it will be advantageous to deploy an own battery for each RLAM or TLAM.

Alternatively it is possible that an RLAM and a correspondent current amplifier share the DC power from PSU. The disadvantage of this configuration is a lower performance compared to a configuration shown in FIG. 4, having the RLAM supplied by a battery.

The current amplifier 41 is a conventional amplifier but is separated from the power supply unit (PSU) 42. Therefore the amplifier can be kept relatively small and can be deployed close to the speaker. The PSU comprises a transformer 44, a rectifier circuit 43 and a voltage regulator 45. As a non-limiting example a toroidal power transformer is used for transformer 44 in a preferred embodiment of the present invention and a high-speed unity gain open-loop buffer current amplifier has been implemented for current amplifier 41. Furthermore the rectifier circuit 43 has been implemented using a glass passivated bridge rectifier.

Figure 5:
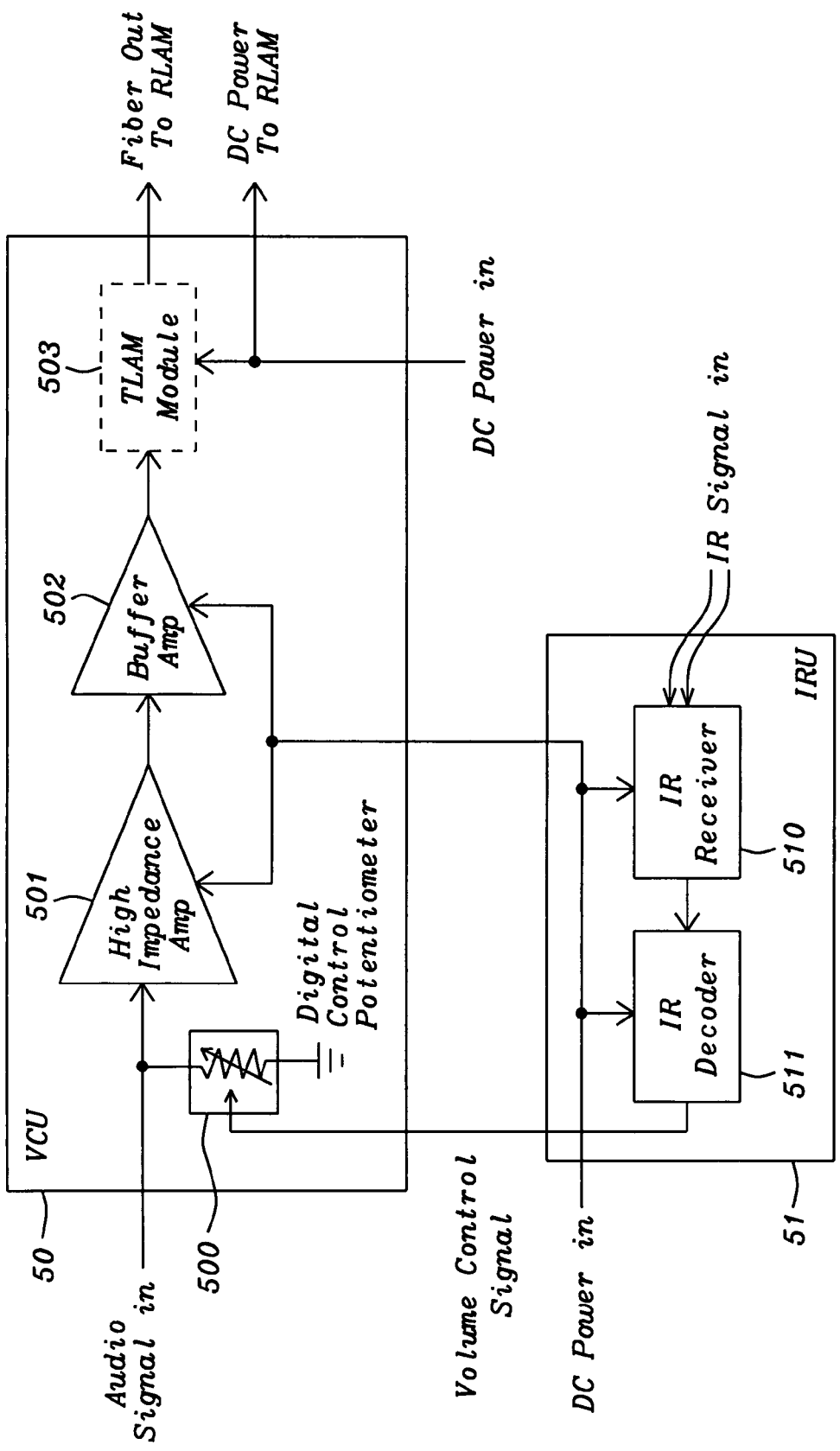
FIG. 5 illustrates a block diagram of a Volume control unit (VCU) and an Infrared Receiver Unit (IRU).

FIG. 5 illustrates a block diagram of a volume control unit (VCU) 50 and an Infrared Receiver Unit (IRU) 51. The input audio signal to the VCU, which can be controlled via a digital control potentiometer 500, is input to a high impedance amplifier 501. The output of the high impedance amplifier 501 is input to the buffer amplifier 502. The output of the buffer amplifier 502 is input to a Transmitter Laser Analog module (TLAM) 503, converting electrical signals into optical signals to be transmitted via an optical fiber cable. Said Transmitter Laser Analog module (TLAM), converting electrical signal into optical signals, is described in co-pending U.S. patent application Ser. No. 11/132,770, filed May 19, 2005, entitled "A Laser Audio Preamplifier, Volume control and Multiplexer" and assigned to the present assignee, and incorporated herein by reference. In a preferred embodiment DC power for the TLAM module is provided by batteries.

Using short fiber cables (e.g. less than 10 m) the same batteries can be used for corresponding RLAM modules.

The Infrared Receiver Unit (IRU) comprises an infrared receiver 510 receiving as input infrared signals. The output of the IR receiver 510 is input to an infrared decoder 502. The output of the infrared decoder 502 controls via the digital control potentiometer 500 the audio signal of the input of the high impedance amplifier 501. As a non-limiting example an audio logarithmic taper digital potentiometer has been selected for the digital control potentiometer 500, a current feedback amplifier has been selected for the buffer amplifier 502, and a low-noise, FET-input operational amplifier has been selected for high impedance amplifier 501 in a preferred embodiment of the invention.

Figure 6:
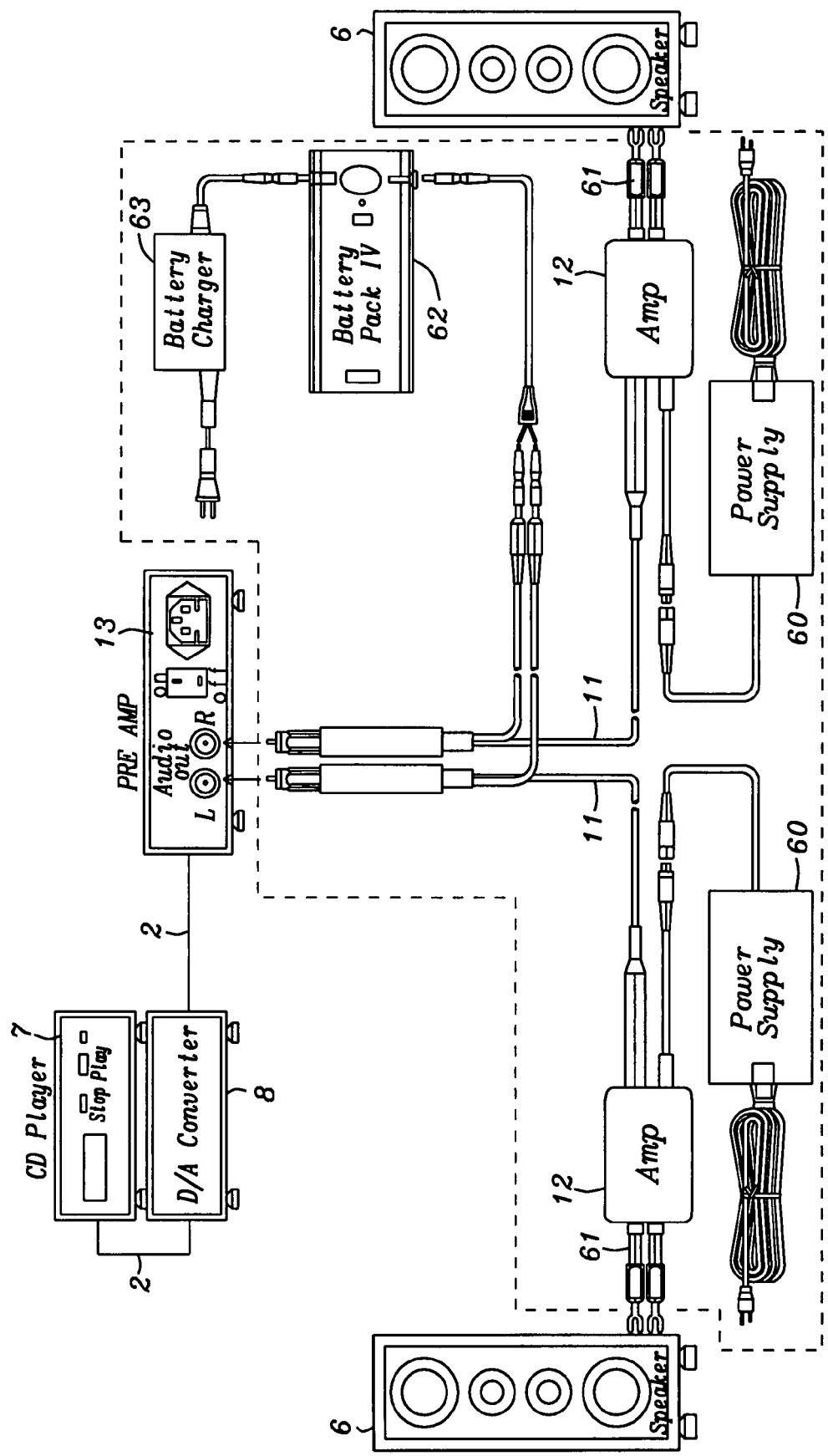
FIG. 6 shows an example of an embodiment of the present invention.

FIG. 6 shows an example of an embodiment of the present invention. This example corresponds to the example of a fiber link connection of the present invention shown in FIG. 1b alternative (f). This embodiment comprises a signal source, e.g. a CD player 7, being connected to digital-to-analog converter (DAC) 8 via a signal cable 2. The DAC 8 is connected via a signal cable 2 to a preamplifier 13, having integrated TLAM modules, converting electrical signals to optical signals. This preamplifier 13 including a volume control function is described in co-pending U.S. patent application Ser. No. 11/132,770, filed May 19, 2005, entitled "A Laser Audio Preamplifier, Volume control and Multiplexer" and assigned to the present assignee, and incorporated herein by reference.

The preamplifier 13 is connected via optical fiber cables 11 to two amplifiers 12 each of them having a Receiver Laser Analog Module (RLAM) integrated. RLAM modules are described in co-pending U.S. patent application Ser. No. 11/132,770, filed May 19, 2005, entitled "A Laser Audio Preamplifier, Volume control and Multiplexer" and assigned to the present assignee, and incorporated herein by reference.

Each amplifier 12 is connected via short speaker cables 61 to a speaker. Furthermore each amplifier 12 has an own power supply 60. Alternatively amplifiers 12 could share a common power supply. Sharing a common power supply could lower the total costs of the system but would sacrifice system performance.

The battery pack 62 supplies DC power for the TLAMs integrated in the preamplifier 13 and for the RLAMs integrated in amplifiers 12. A battery charger 63 charges battery pack 62.

Figure 7:
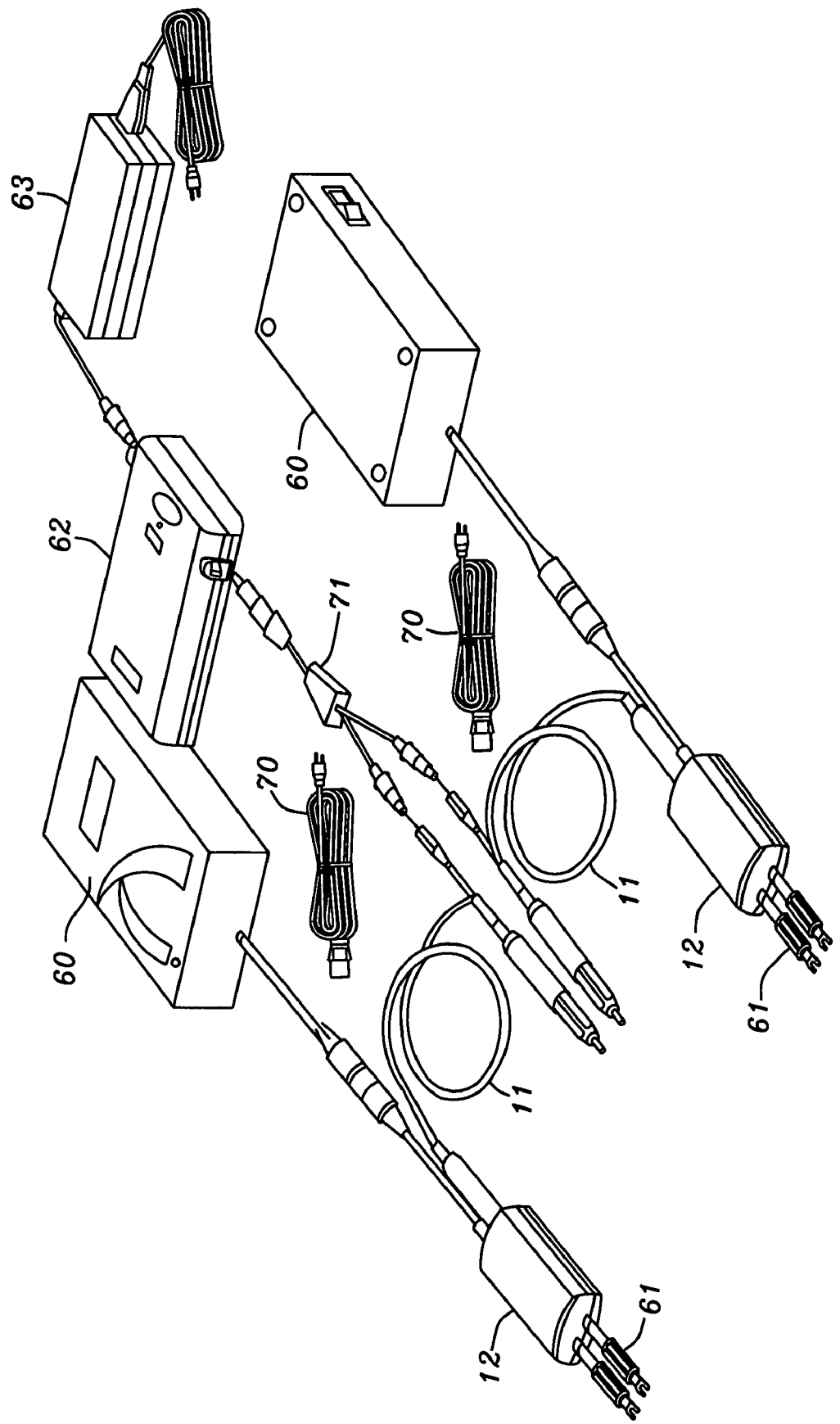
FIG. 7 shows the components of an embodiment of the system of the present invention.

FIG. 7 shows the components of an embodiment of the system of the present invention. This embodiment of the invention comprises a pair of amplifiers 12, a pair of power supply units 60 for DC power required by the amplifiers 12. Each of the amplifiers 12 can be connected via a pair of short speaker cables 61 to a speaker (not shown). A pair of power cords 70 for the power supply units 60, a battery pack 62 for the power supply of RLAMs and TLAMs, a Y-cable 71 to allow to cables to share battery pack 62, a battery charger 63 and a pair of fiber optic cables 11.

Figure 8:
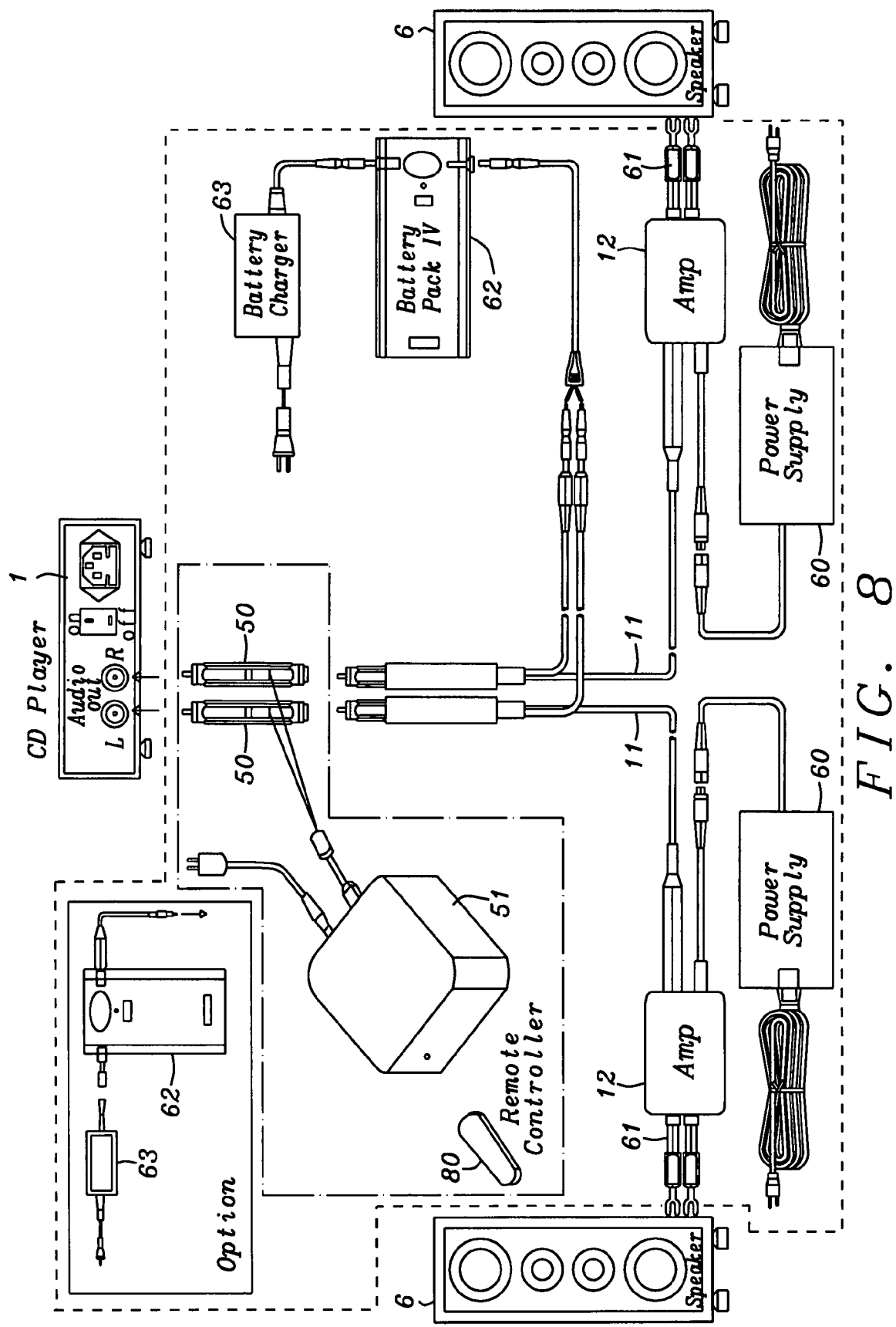
FIG. 8 shows the fiber link connection of an audio source having volume control modules with integrated TLAMs, which are connected via optical fiber cables to amplifiers having RLAMS integrated.

FIG. 8 shows the fiber link connection correspondent to FIG. 1b alternative (d), i.e. an audio source having volume control modules with integrated TLAMs, which are connected via optical fiber cables to amplifiers having RLAMS integrated, wherein the amplifiers are plugged onto speakers. A pair of Volume Control Units (VCU) 50, having integrated TLAMS is plugged into an audio source, e.g. a CD player 1. Infrared receiver Unit (IRU) 51, controls the volume of the audio signal from the CD-Player 1. A remote infrared controller 80 provides the input signal for the IRU 51. The volume control signal is transferred via a pair of cables to both VCUs 50.

The IRU 51 can be used with an AC-DC adapter but another battery pack 62 is recommended for best performance of the VCU 51. This battery pack 81 is shown as an option in FIG. 8, it can be charged via battery charger 63. The VCUs 50 are connected via optical fiber cables 11 to two Laser audio amplifiers 12 each of them having a Receiver Laser Analog Module (RLAM) integrated.

Each amplifier 12 is connected via short speaker cables 61 to a speaker. Furthermore each amplifier 12 has a own power supply 60. The battery pack 62 supplies DC power for the TLAMs integrated in the preamplifier 13 and for the RLAMs integrated in amplifiers 12. A battery charger 63 charges battery pack 62.

Figure 9:
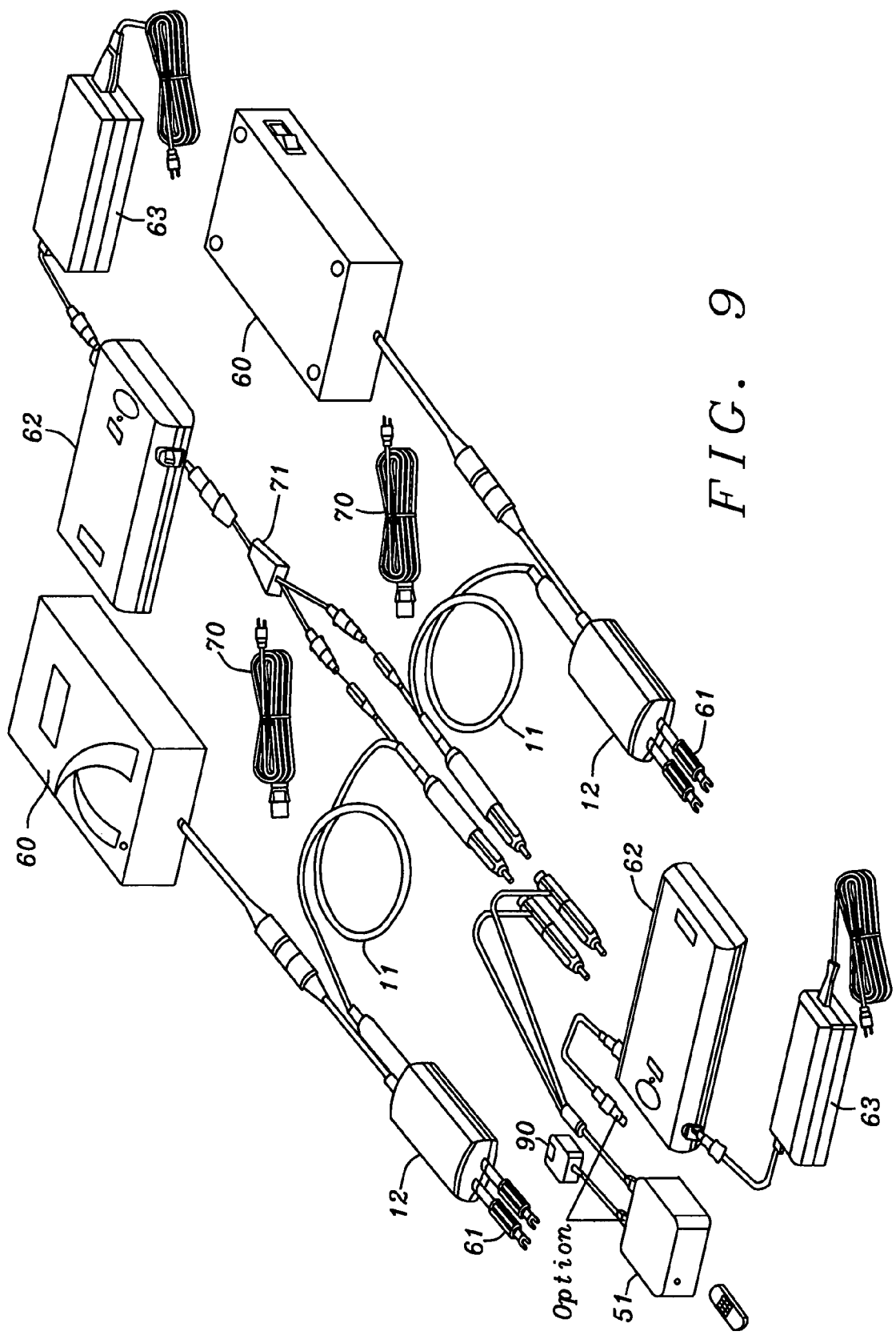
FIG. 9 shows the fiber link components for the connection schematic of FIG. 8.

FIG. 9 shows the fiber link components for the connection schematic of FIG. 8. This embodiment of the invention comprises a pair of amplifiers 12, a pair of power supply units 60 for DC power required by the amplifiers 12. Each of the amplifiers 12 can be connected via a pair of short speaker cables 61 to a speaker (not shown). A pair of power cords 70 for the power supply units 60, a battery pack 62 for the power supply of RLAMs and TLAMs, a Y-cable 71 to allow to cables to share battery pack 62, a battery charger 63 and a pair of fiber optic cables 11. Furthermore an infrared receiver (IR) 51 is shown having two options for the DC power supply. A first option is an AC/DC adapter 90 to supply the IRU 51; a second option is another battery pack 62, which can be charged by battery charger 63.

The battery pack 62 of FIGS. 6, 7, 8, and 9 are in a preferred embodiment of the present invention a rechargeable Ll-ion battery pack. In order to avoid the noise from AC power and battery charger into the path of audio signals, the battery pack should not be charged when it is discharging to support Laser Analog modules (LAM) and VCU/IRU. In case of empty batteries and operation required the empty batteries should be replaced by fully charged batteries. For a user-friendly solution an auto switch battery (ASB) has been designed.

Figure 10:
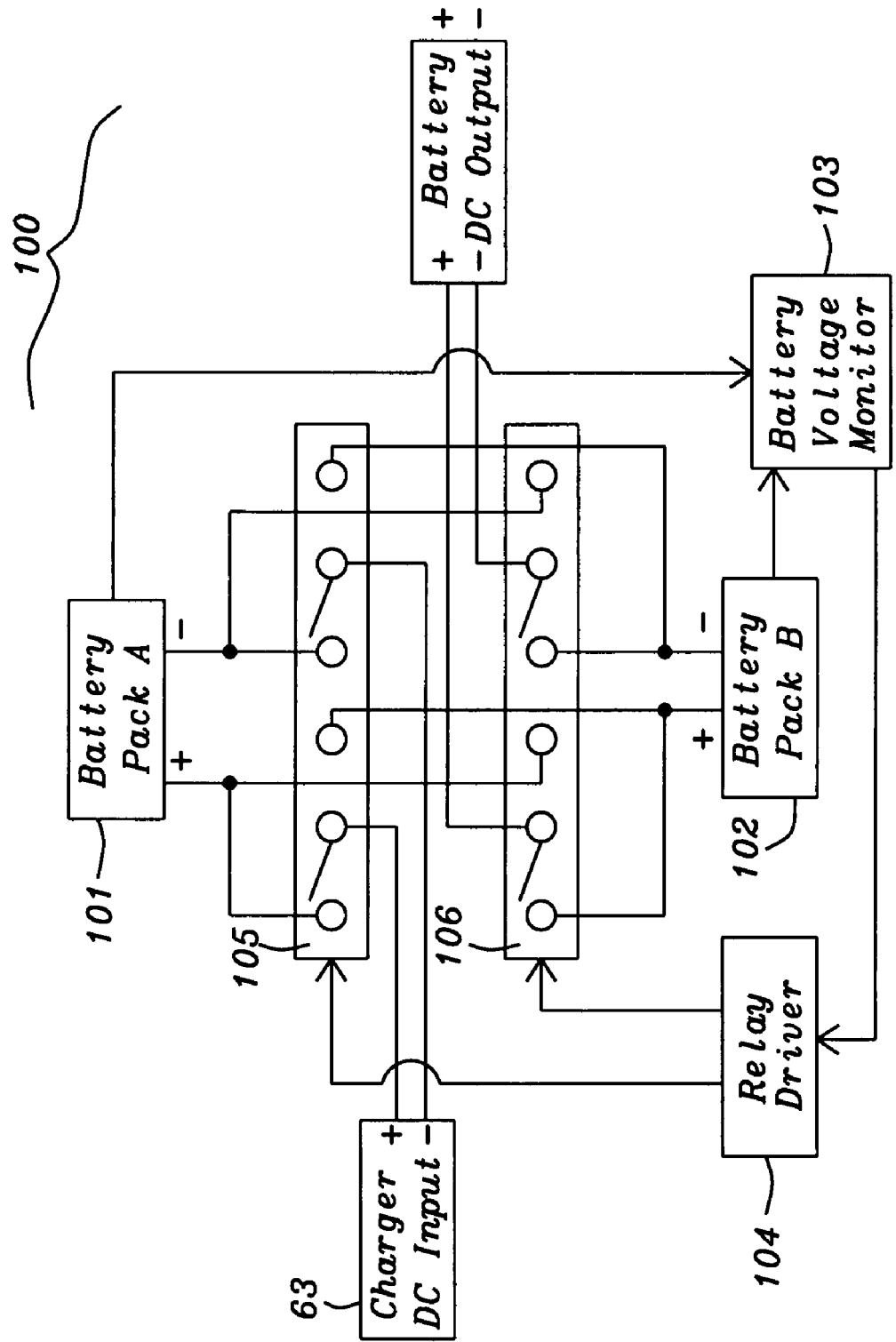
FIG. 10 illustrates a schematic of an Auto Switch Battery (ASB).

FIG. 10 illustrates a schematic of an Auto Switch Battery (ASB) 100 avoiding noise from AC power and battery charger into the path of audio signals. Power. Inside the ASB, there are two battery packs A&B 101 and 102. A battery voltage monitor 103 detects the voltage of each battery pack 101 and 102 and will use the relay driver 104 to set the two relay sets 105 and 106 simultaneously. The charge speed (defined by a battery charger 63) is designed in a preferred embodiment to be 1.5 times of maximum discharge speed (dependent upon the load). Other charge speeds are possible as well as long as the charge speed is higher than the speed of discharge. Therefore, the ASB 100 won't be empty as long as the charger is connected to the ASB 100. It is obvious that an ASB can be used for other noise sensitive battery-driven electronic devices.

The operation of the ASB is. (a) when the charger 63 DC input plugs into ASB, the lower voltage battery pack (say pack A 101) starts to charge and the higher voltage battery pack (in this case battery pack 102) is ready to discharge. (b) By design the charge speed is faster, e.g. 1.5 times faster, than the speed of discharge. When pack A 101 is charged to maximum level, the charge stops. (c) When pack B 102 discharges to a minimum level, ASB switches the state. Pack A 101 starts to discharge, and pack B 102 starts to be charged. (d) When pack B reaches the maximum level, the charge stops. (e) Then, the two battery packs charge and discharge alternatively.

Figure 12:
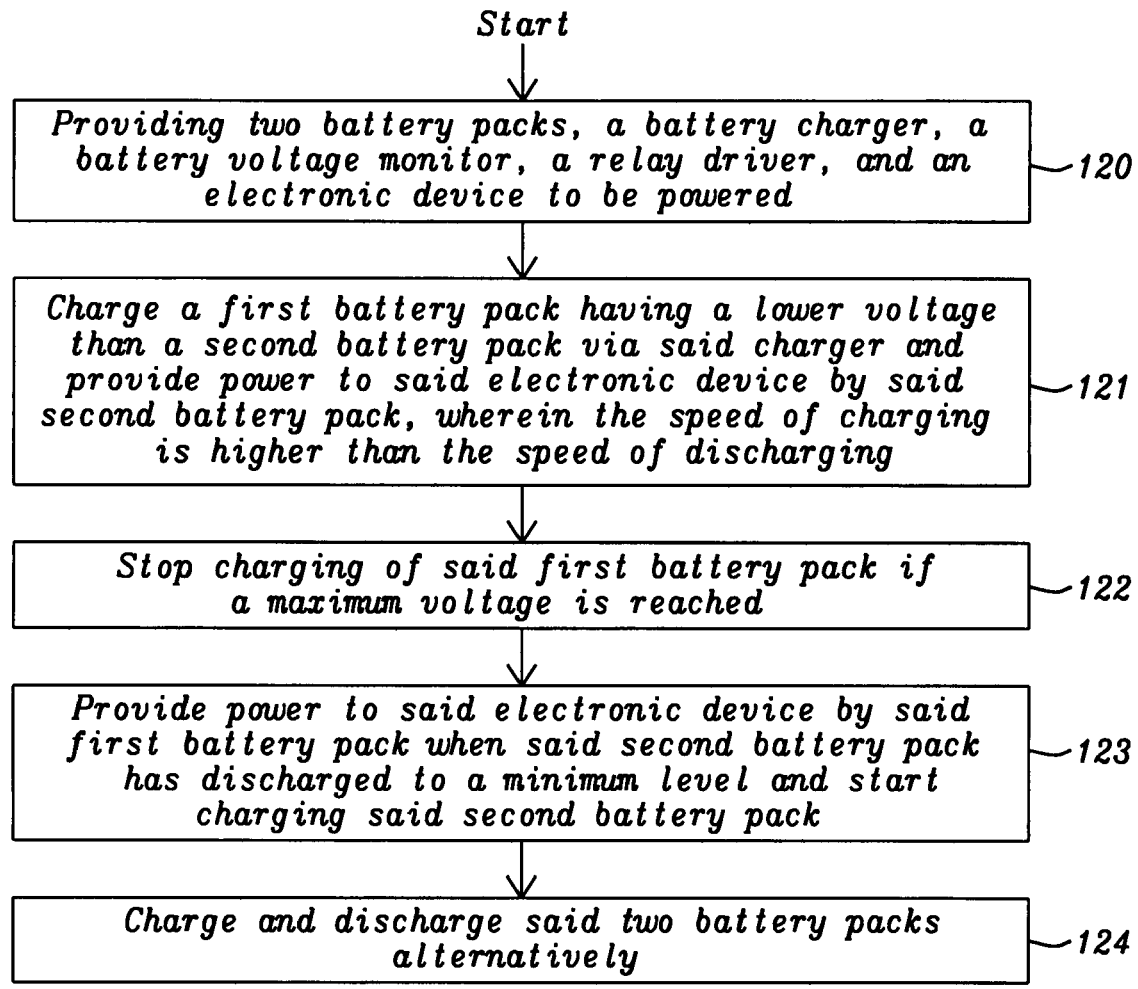
FIG. 12 illustrates a method to avoid noise from AC power and battery charger into the path of audio signals.

FIG. 12 illustrates a method to avoid noise from AC power and battery charger into the path of audio signals. Step 120 illustrates the provision of two battery packs, a battery charger, a battery voltage monitor, a relay driver, and an electronic device to be powered. Step 121 illustrates charging a first battery pack having a lower voltage than a second battery pack via said charger and providing power to said electronic device by said second battery pack, wherein the speed of charging is higher than the speed of discharging. Step 122 illustrates that charging of a first battery pack is stopped if a maximum voltage is reached. In the following step 123 of the method invented the power to the electronic device is provided by the first battery pack when said second battery pack has discharged to a minimum level and starts charging said second battery pack. The last method step 124 describes that the two battery packs are charging and discharging alternatively.

Figure 11:
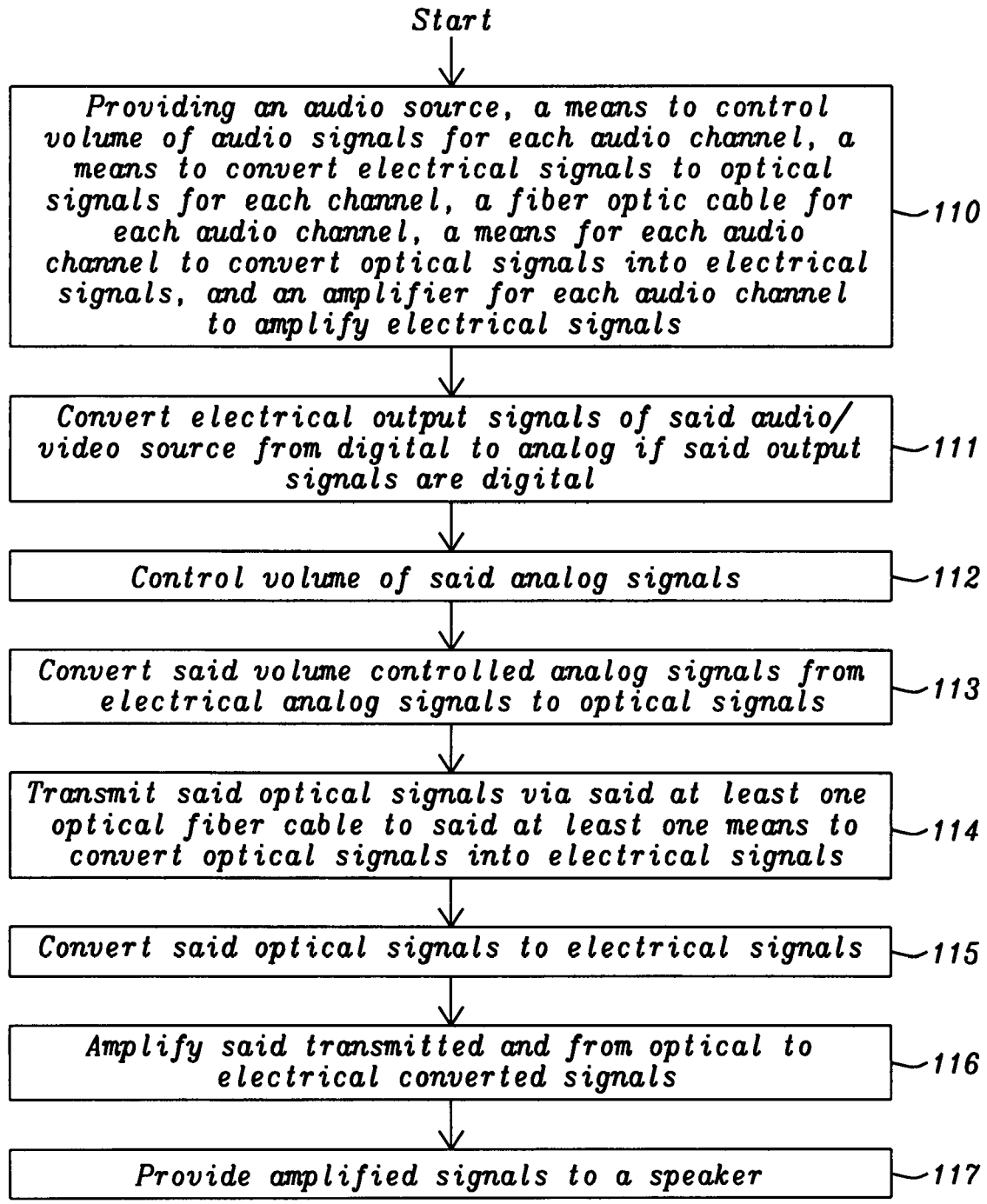
FIG. 11 illustrates a method to minimize signal loss and distortions in connections of audio sources and speakers.

FIG. 11 illustrates a method to minimize signal loss and distortions in connections of audio sources and speakers. The first step 110 of the method invented describes the provision of an audio source, a means for each audio channel to control volume of audio signals, a means for each audio channel to convert electrical signals to optical signals, a fiber optic cable for each audio channel, a means for each audio channel to convert optical signals into electrical signals, and an amplifier for each audio channel to amplify electrical signals. In a preferred embodiment the means to control volume of audio signals is a VC as described above, the means to convert electrical signals to optical signals is a TLAM, and the means to convert optical signals into electrical signals is an RLAM. The following step 111 illustrates a conversion of electrical output signals of said audio/video source from digital to analog if said output signals are digital. Then in step 112 the volume of said analog signals is controlled. In step 113 said volume controlled signals are converted from electrical to optical signals, followed, in step 114, by a transmission of said optical signals via said at least one optical fiber cable to said at least one means to convert optical signals into electrical signals. In step 115 said transmitted optical signals are converted to electrical signals and in step 116 these transmitted and from optical to electrical converted signals are amplified. In the last step 117 said amplified signals are provided as input to a speaker. This can be performed by a direct plug-in of the amplifier to a speaker or via a short speaker cable.

While the invention has been particularly shown and described with reference to the preferred embodiments thereof, it will be understood by those skilled in the art that various changes in form and details may be made without departing from the spirit and scope of the invention.

What is claimed is:

1. A method to connect all audio and video components of an audio/video system is comprising the following steps:
providing an audio source, at least one volume control module of audio signals, comprising a digital potentiometer setting the strength of the audio signals, wherein the control potentiometer is controlled by a volume control signal from an infrared decoder of an infrared receiver unit, an amplifier having an input and an output, wherein the input is said audio signal modified by said potentiometer and its output is the input of a buffer amplifier, said buffer amplifier having an input and an output, wherein its output is the input of a Transmitter Laser Analog Module, and said infrared receiver unit receiving infrared volume control signals comprising an infrared receiver receiving said infrared volume control signals, wherein its output is the input of said infrared decoder, and said infrared decoder wherein its output controls said digital control potentiometer, a means to convert for each audio channel electrical signals to optical signals, a fiber optic cable for each audio channel, a means to convert for each audio channel optical signals to electrical signals, and an amplifier for each audio channel to amplify electrical signals;

converting electrical output signals of said audio source from digital to analog if said output signals are digital;

controlling volume of said analog signals by said volume control module;

converting said volume controlled analog signals from electrical signals to optical signals;

transmitting said optical signals via said optical fiber cables to said at least one means to convert optical signals to electrical signals;

converting said optical signals to electrical signals;

amplifying said transmitted and from optical to electrical converted signals; and providing amplified signals to a speaker.

2. The method of claim 1 wherein said means to control volume of audio signals is integrated in a preamplifier.

3. The method of claim 1 wherein said means to convert electrical signals to optical signals is a Transmitter Laser Analog Module.

4. The method of claim 1 wherein said means to convert optical signals to electrical signals is a Receiver Laser Analog Module.

5. The method of claim 1 wherein said amplifier is directly plugged in a speaker.

6. The method of claim 1 wherein said amplifier is connected to a speaker via a cable.

7. A system to transmit analog electronic signals from an audio source to speakers via fiber optic cables is comprising:
a Transmitter Laser Analog Module for each audio channel converting electronic signals into modulated optical signals, wherein the volume of said electronic signals is controlled by a volume control module comprising a digital control potentiometer setting the strength of said electronic signals, wherein the control potentiometer is controlled by a volume control signal from an infrared decoder of an infrared receiver unit;

a volume control module controlling the volume of said electronic signals comprising:
a digital control potentiometer setting the strength of said electronic signals, wherein the control potentiometer is controlled by a volume control signal from an infrared decoder of an infrared receiver unit;

an amplifier having an input and an output, wherein the input is said audio signal modified by said potentiometer and its output is the input of a buffer amplifier;

said buffer amplifier having an input and an output, wherein its output is the input of a Transmitter Laser Analog Module;

said infrared receiver unit receiving infrared volume control signals comprising:
an infrared receiver receiving said infrared volume control signals, wherein its output is the input of said infrared decoder; and said infrared decoder wherein its output controls said digital control potentiometer;

a Receiver Laser Analog Module for each audio channel converting optical signals into analog electrical signals;

a fiber optic cable for each audio channel to transmit said optical signals from said Transmitter Laser Analog Module to said Receiver Laser Analog Module; and an amplifier unit for each audio channel to amplify said electrical signals received by said Receiver Laser Analog Module.

8. The system of claim 7 wherein said Transmitter Laser Analog Module is integrated within said volume control unit.

9. The system of claim 8 wherein said Transmitter Laser Analog Module has a same DC supply voltage as said volume control unit.

10. The system of claim 8 wherein said Transmitter Laser Analog Module has a DC supply voltage that is separated from the supply voltage of said volume control unit.

11. The system of claim 7 wherein a DC supply voltage for said Transmitter Laser Analog Module is provided by a battery pack.

12. The system of claim 11 wherein said DC supply voltage for the Transmitter Laser Analog Module is provided by an Auto switch battery comprising:
two battery packs, which are alternatively connected via a two sets of relay to a DC output voltage;
a battery voltage monitor, monitoring the voltage of both said battery packs and controlling a relay driver;
said relay driver driving said two sets of relay;
said two sets of relay connecting a first of said battery packs to output voltage and a second of said battery packs to a charger voltage.

13. The system of claim 7 wherein said wherein a DC supply voltage for said Receiver Laser Analog Module is provided by a battery pack.

14. The system of claim 13 wherein said DC supply voltage for the Receiver Laser Analog Module is provided by an Auto switch battery comprising:
two battery packs, which are alternatively connected via a two sets of relay to a DC output voltage;
a battery voltage monitor, monitoring the voltage of both said battery packs and controlling a relay driver;
said relay driver driving said two sets of relay;
said two sets of relay connecting a first of said battery packs to output voltage and a second of said battery packs to a charger voltage.

15. The system of claim 7 wherein said Receiver Laser Analog Module and said Transmitter Laser Analog Module are sharing a same DC power source.

16. The system of claim 7 wherein said Transmitter Laser Analog Module is separated from said volume control unit.

17. The system of claim 16 wherein said Transmitter Laser Analog Module has a same DC supply voltage as said volume control unit.

18. The system of claim 16 wherein said Transmitter Laser Analog Module has a DC supply voltage that is separated from the supply voltage of said volume control unit.

19. The system of claim 7 wherein said amplifier unit comprises a current amplifier having an input and an output, wherein its input is the output of a Receiver Laser Analog Module and its output is the input of a speaker and wherein said current amplifier receives power from a power supply unit.

20. The system of claim 19 wherein said power supply unit is separated from said amplifier unit.

21. The system of claim 19 wherein said power supply unit comprises a toroidal power transformer transforming AC power input, a rectifier circuit rectifying the output of said power transformer and a regulator, regulating an DC output from said rectifying circuit and supplying with its output said current amplifier.

22. The system of claim 21 wherein said rectifier is a glass passivated bridge rectifier.

23. The system of claim 19 wherein said current amplifier is a high-speed current amplifier.

24. The system of claim 7 wherein said Receiver Laser Analog Module is integrated in each of said amplifier units.

25. The system of claim 7 wherein said Receiver Laser Analog Module is separated from said amplifier units and its output is the input of said amplifier unit.

26. The system of claim 7 wherein said amplifier unit is plugged in a speaker.

27. The system of claim 7 wherein said amplifier unit is connected to a speaker via a cable.

28. The system of claim 27 wherein said cable has plugs on both ends.

29. The system of claim 27 wherein said cable has a plug to be connected with a speaker and is fastened fixed with said amplifier.

30. The system of claim 7 wherein said amplifier unit has a separate power supply unit.

31. The system of claim 30 wherein said power supply unit comprises a toroidal power transformer transforming AC power input, a rectifier circuit rectifying the output of said power transformer and a regulator, regulating an DC output from said rectifying circuit and supplying with its output said amplifier unit.

32. A method to supply DC power to noise-sensitive electronic devices comprising the method steps:
providing two battery packs, one battery charger, a battery voltage monitor, a relay driver, and an electronic device to be powered;
charging a first battery pack having a lower voltage than a second battery pack via said charger and providing power to said electronic device by said second battery pack, wherein the speed of charging is higher than the speed of discharging;
stopping charging of said first battery pack if a maximum voltage is reached;
providing power to said electronic device by said first battery pack when said second battery pack has discharged to a minimum level and start charging said second battery pack by said charger; and
charging and discharging said two battery packs alternatively.

* * * * *